April 23, 1963  J. W. MARTT  3,086,728
EXPANSIBLE MANDREL MECHANISM
Filed July 11, 1960  3 Sheets-Sheet 1
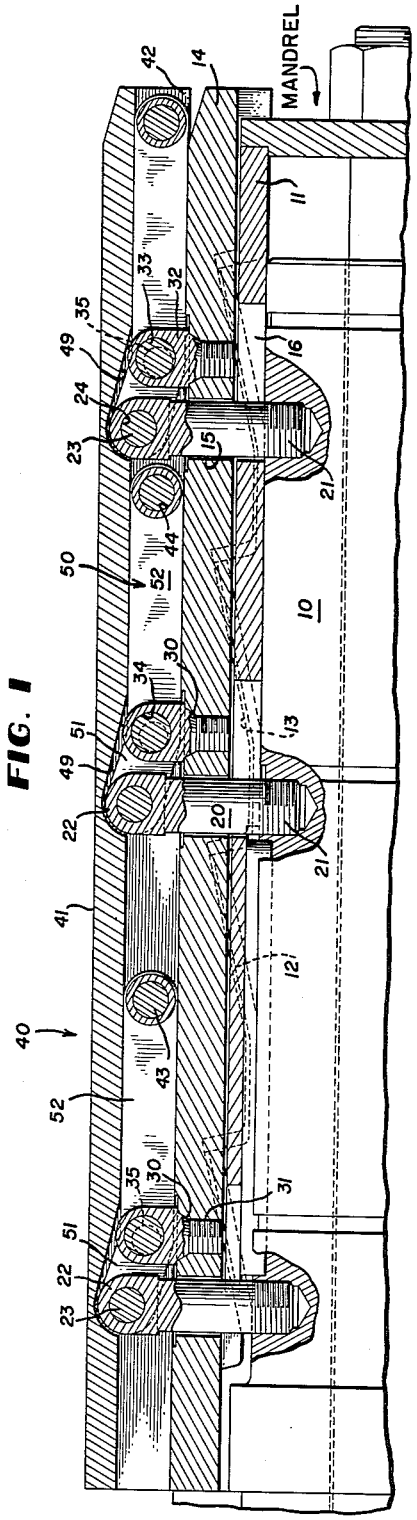
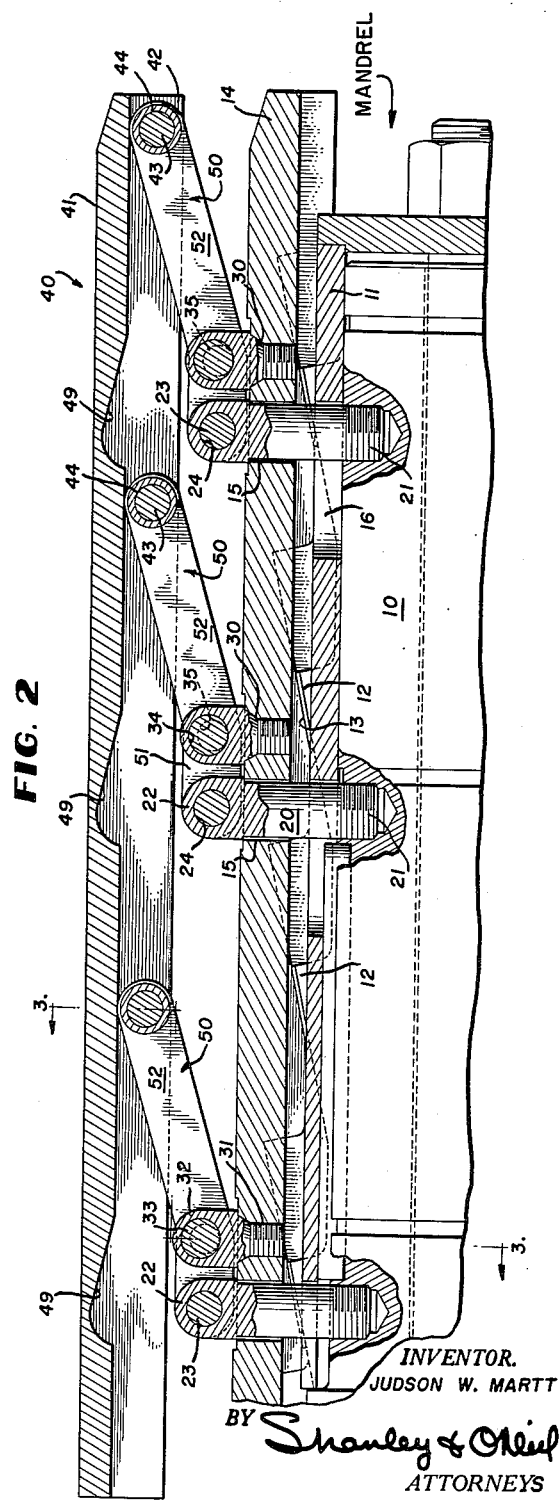
INVENTOR.
JUDSON W. MARTT
BY Shanley & O'Neil
ATTORNEYS April 23, 1963     J. W. MARTT     3,086,728
EXPANSIBLE MANDREL MECHANISM
Filed July 11, 1960     3 Sheets-Sheet 2
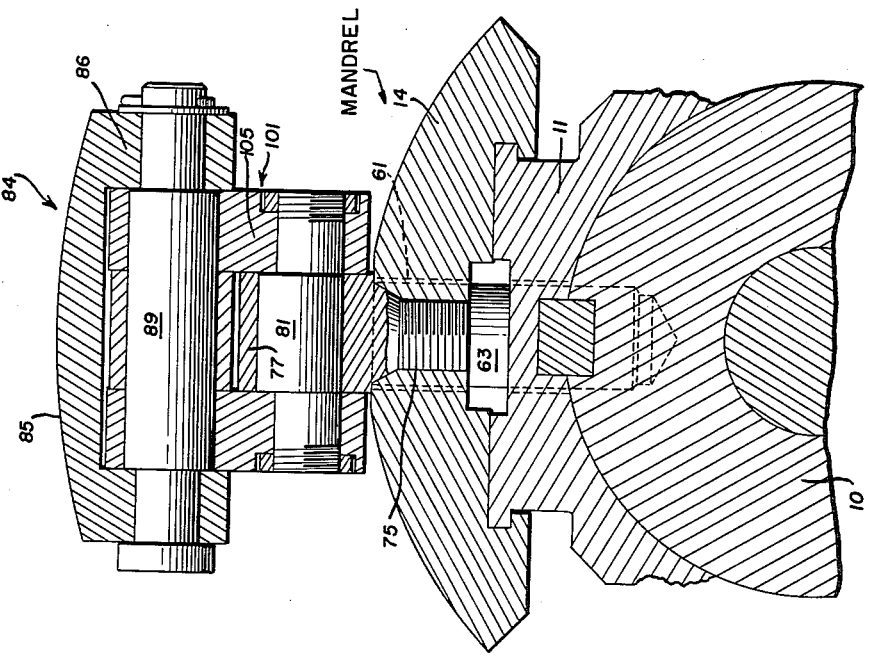
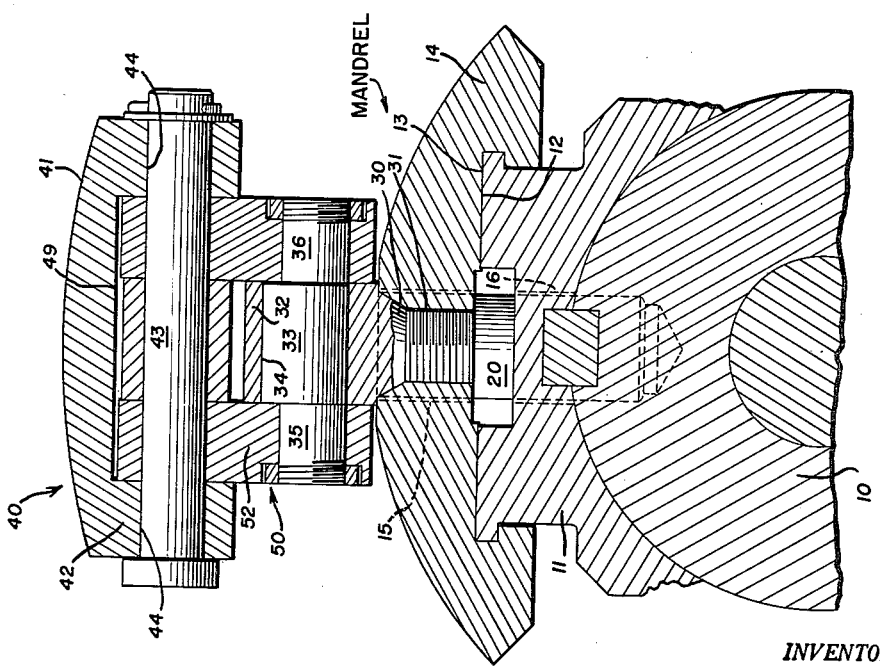
INVENTOR.
JUDSON W. MARTT
BY Shanley & O'Neil
ATTORNEYS

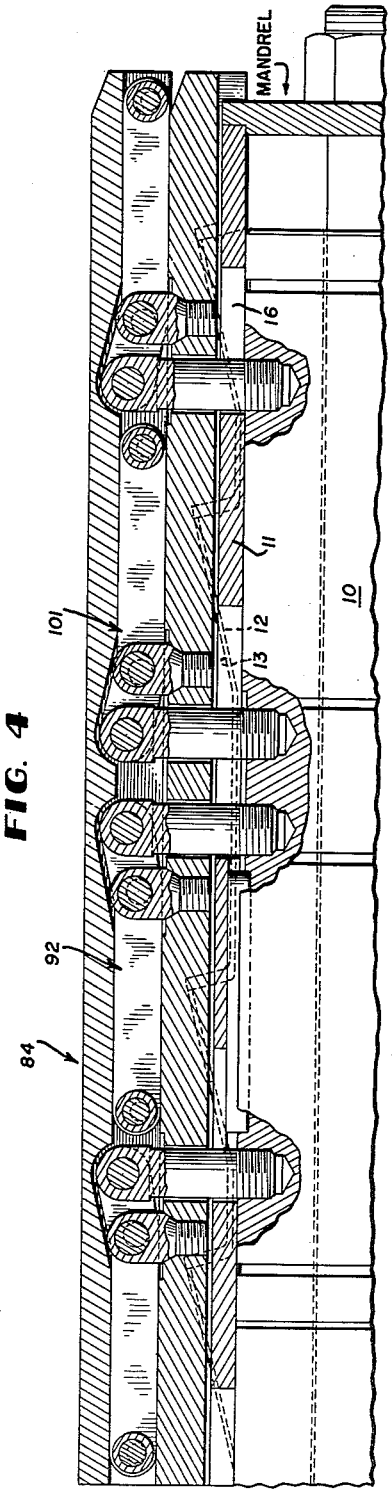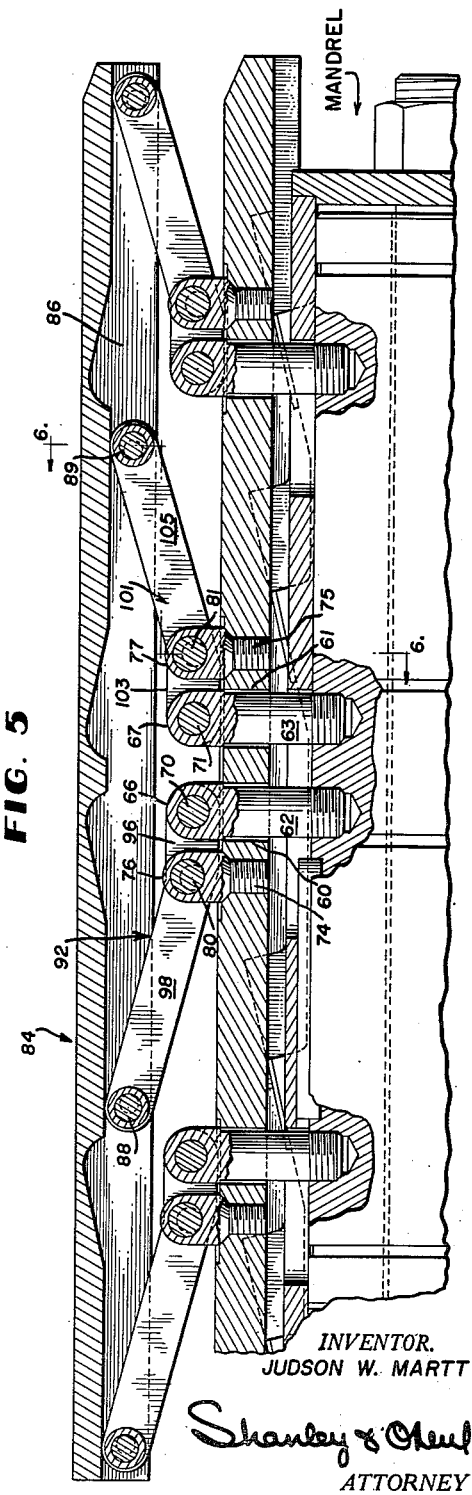

United States Patent Office 3,086,728
Patented Apr. 23, 1963

3,086,728
EXPANSIBLE MANDREL MECHANISM
Judson W. Martt, Weirton, W. Va., assignor to National Steel Corporation, a corporation of Delaware
Filed July 11, 1960, Ser. No. 42,066
6 Claims. (Cl. 242—72.1)

The invention includes an improved mechanism for operating expansible mandrels, arbors, and the like.

Expansible mandrels find many uses in industry, one of the most common of which is as a support for coiling or uncoiling metallic strip. In this use the peripheral surfaces of the mandrel must be able to expand or contract radially in order to grip or release a coil or provide support for winding or unwinding the coil. In the steel industry, especially large tonnage coils must be handled so that the apparatus must be of rugged and heavy duty construction. In the past, the heavy duty requirements have placed narrow limits on the radial expansion or contraction available with a given mandrel. Handling a coil with an inside diameter which fell outside these narrow limits was either impossible or necessitated tedious measures such as changing mandrels or shifting the work to be handled to other lines or mills. It is an object of this invention to provide an improved mechanism for a mandrel which substantially eliminates these problems by providing wide range expansion and contraction.

Another object of the invention is to provide a mandrel expansion and contraction mechanism which will increase the narrow operation limits of mandrels without substantial modification of presently installed apparatus and without sacrificing strength or durability.

Other objects and advantages of the invention will become apparent during the ensuing detailed description of the invention.

The present invention is especially useful for increasing the coil handling abilities of currently installed mandrels and while not limited thereto, will be described in such an environment. In describing a specific embodiment, reference will be had to the following drawing in which like numbers have been used throughout to designate duplicate parts:

FIGURE 1 is a cross-sectional view of an embodiment of the invention in retracted position;

FIGURE 2 is a cross-sectional view of the embodiment of FIGURE 1 in extended position;

FIGURE 3 is a transverse cross-sectional view of the embodiment of FIGURE 2 taken along the lines 3—3 of FIGURE 2, FIGURE 4 is a cross-sectional view of another embodiment of the invention in retracted position;

FIGURE 5 is a cross-sectional view of the embodiment of FIGURE 4 in extended position; and, FIGURE 6 is a transverse cross-sectional view taken along lines 6—6 of FIGURE 5.

Broadly the invention includes a control mechanism for expanding and contracting a mandrel in which an eccentric means is used to interconnect a motion modifying means between a source of motion and a movable segment of the mandrel.

The invention will be described specifically with coil handling apparatus wherein the radial motion of an outer segment of a prior art expansible mandrel which may be of the type described in the patent to Tyrrell 2,578,953 or Russell 2,755,031 is multiplied by linkage means connecting the outer segment to a supplementary peripheral segment. The linkage means includes a motion multiplying lever means and an eccentric member which permits use of the multiplying advantages of a lever means while compensating for the inherent curvilinear motion of a lever.

Referring to FIGURES 1-3 inclusive, the mandrel has a fixed core 10 on which an axially movable sleeve 11 is mounted. Sleeve 11 carries inclined planes or wedge surfaces 12 which contact the inclined planes or wedge surfaces 13. The wedge surfaces 13 are formed on radially movable segment 14. Axial motion of sleeve 11 on fixed core core 10 is converted to radial motion of the segment 14 by the wedge surfaces 12 and 13 and constitutes a source of motion within the mandrel. This and other sources of motion well-known in the art place no limits on the invention and further explanation is not necessary to an understanding of the invention.

The radially movable segment 14 has bored sections 15 and sleeve 11 has slots 16 through which fixed lugs 20 penetrate the segment 14 and sleeve 11 and are immovably secured to the fixed core 10 by threads 21. Each fixed lug 20 has a head portion 22 which is journaled to receive shaft 23. Shaft 23 is rotatable within bearing surface 24 in head 22. The radially movable segment 14 has lugs 30 secured to it by threads 31. Each lug 30 has a head portion 32 which is journaled to receive an eccentric member 33. Eccentric shaft member 33 is rotatable within the bearing surface 34 in the head 32. Eccentrically disposed shaft portions 35 and 36 (see FIGURE 3) are parts of member 33 and will be described in greater detail later.

Mounted externally to the radially movable segment 14 is peripheral segment 40, having a curved peripheral surface 41 (see FIGURE 3) and inner body 42. The inner body 42 of peripheral segment 40 is journaled at 44 to receive shaft 43. Shaft 43 is rotatable within the bearing surface 44.

Fixed lug 20, lug 30, and peripheral segment 40 are connected by lever 50. Lever 50 has its fulcrum at the center of shaft 23 and an input arm 51 extending between fixed lug 20 and movable lug 30. The output arm of lever 50 includes the arm 51 and an arm 52 extending from the movable lug 30 to the peripheral segment 40. Lever 50 is journaled and pivotally mounted at each of its connecting points which are: shaft 23 at fixed lug 20, eccentric shaft 35 at lug 30, and shaft 43 at peripheral segment 40.

Input motion is supplied to lever 50 by lug 30 which moves in a radial direction in response to the axial motion of sleeve 11. Lug 30 is confined to a rectilinear, radial motion because the segment 14, to which movable lug 30 is secured, is confined to such motion by lug 20 which is fixed to the core 10. Segment 14 may also be confined to rectilinear radial motion by other elements at the reel support (not shown). The eccentric coupling between lug 30 and lever 50 converts the rectilinear radial motion of lug 30 into curvilinear radial motion so that lever 50 rotates about its fulcrum at shaft 23. The instantaneous input motion supplied to lever 50 is multiplied by an amount equal to the ratio of the effective output lever arm extending between shaft 23 and shaft 43 and the effective input lever arm extending between shaft 23 and shaft 33. The resultant rectilinear radial component of the motion imparted to segment 40 by shaft 43 (ignoring a relatively small axial component) has a mechanical advantage in motion substantially equal to the mechanical advantage of lever 50 which may readily be determined in the well-known manner based on the ratio of the effective output and input arms of the lever.

Referring particularly to FIGURE 1, the mandrel is shown in its collapsed form with a cutaway nesting portion 49 of segment 40 contacting the fixed lug head 22 in part. This figure shows the advantage of the "bell crank" type lever arm, a compact fit when the mandrel is in the collapsed form.

In the interest of brevity a single expansion mechanism and peripheral surface have been described although it will be obvious to those skilled in the art that the number of expansion mechanisms and peripheral surfaces employed will be dependent upon the particular application.

FIGURE 3, a transverse cross-sectional view through the movable lug 30 along the lines 3—3 of FIGURE 2, shows that lever 50 is a twin shank lever which is rotatably mounted on the eccentric shaft portion 35 while the movable lug head 32 is rotatably mounted on eccentric shaft portion 36. Eccentric member 33 is a solid member presenting the two shaft surfaces 35 and 36 which are eccentric to each other. Other embodiments for the eccentric become apparent with this view, e.g. the eccentricity may be introduced by using the shaft surfaces oppositely or may be introduced in the head and lever bearing surfaces rather than the shaft surfaces.

In expanding and collapsing the mandrel illustrated in FIGURES 1 and 2, a slight axial movement of the peripheral segment 40 takes place. The motion of the shaft 43 is curvilinear, the path traveled being an arc in the circumference of a circle having its center at shaft 23. The major component of the curvilinear motion is the radial motion imparted to the peripheral segment 40, however, there is a minor component of axial motion which is also imparted to segment 40. In accordance with the invention, this slight axial component can be eliminated by using an eccentric arrangement at the output end of each lever 50.

FIGURES 4 and 5 are directed to a mandrel which includes the motion multiplying advantages of the mandrel of FIGURES 1 to 3 and which additionally eliminates all axial motion of the outer segment. This makes possible an opposed lever arrangement having advantages set out later. FIGURE 4 shows a portion of the mandrel in its collapsed form; FIGURE 5 is a portion of the mandrel in its expanded form.

The mandrel of FIGURES 4 and 5, in many ways, is identical in structure and function to that of FIGURES 1 and 2. The source of motion for expanding and collapsing the mandrel is axial motion of sleeve 11 on fixed core 10 which is converted into radial motion of segment 14 by the wedge surfaces 12 and 13. The radially movable segment 14 is bored at 60 and 61 and the fixed lugs 62 and 63 penetrate through these bored sections and are secured to the fixed core 10. The fixed lugs 62 and 63 have head portions 66 and 67 which are journaled to receive shafts 70 and 71 respectively. On opposed sides of the fixed lugs 62 and 63 movable lugs 74 and 75 respectively are secured to the radially movable segment 14. As in the embodiment of FIGURES 1 and 2, movable lugs 74 and 75 are confined to rectilinear radial motion by such attachment. Movable lugs 74 and 75 have head portions 76 and 77 which are journaled to receive the eccentric shaft members 80 and 81 respectively.

A radially movable peripheral segment 84 is mounted externally to the radially movable segment 14 and includes an outer peripheral surface 85 and an inner body 86. The inner body 86 is journaled to receive eccentric shaft members 88 and 89. The eccentric shaft members 88 and 89 are rotatable within bearing surfaces in the inner body 86 of the radially movable peripheral segment 84.

A lever 92 connects fixed lug 62, movable lug 74, and peripheral segment 84. Lever 98 has its fulcrum at the center of shaft 70 which is pivotally mounted in the fixed lug head 66. The output arm of lever 92 includes an arm 96 extending between the fixed lug 62 and the movable lug 74, and an arm 98 extending from the movable lug 74 to the peripheral segment 84. Lever 92 is connected to the peripheral segment 84 by the eccentric shaft member 88. Lever 92 is journaled and pivotally mounted at each of its connecting points which are: shaft 70 at the fixed lug 62, eccentric shaft member 80 at the movable lug 74, and eccentric shaft member 88 at the peripheral segment 84.

A lever 101, extending in an opposite axial direction from lever 92, connects fixed lug 63, movable lug 75, and the peripheral segment 84. Similar to lever 95, lever 101 includes an input arm 103 and an output arm which includes arm 103 and arm 105. Lever 101 is pivotally mounted at each of its connecting points which are: shaft 71 at fixed lug 63, eccentric shaft member 81 at lug 75, and eccentric shaft member 89 at peripheral segment 84.

Each expansion and contraction mechanism in the embodiment of FIGURES 4 and 5 includes opposed levers such as 92 and 101 for multiplying the radial motion of segment 14. The levers 92 and 101 are similarly connected to fixed core 10 and movable segment 14. However they extend in opposite axial directions and have a "back to back" relationship. The purpose for such arrangement will be described in subsequent paragraphs.

In operation, eccentric 80 acts to convert the rectilinear radial motion of the movable lug 74 to curvilinear radial motion which is imparted to the lever 92. At the output end of lever 92 the curvilinear radial motion is converted to rectilinear radial motion by the eccentric shaft member 88, and is imparted to the peripheral segment 84 through the journaled connection to the inner body 86. Lever 101 and the respective members of that linkage operate in like manner.

By extending the levers 92 and 101 in opposite axial directions, a constraining force against axial motion is exerted which assures operation of the eccentric shaft members 88 and 89. The opposed levers exert a constraining force which eliminates all axial motion of the peripheral segment and eliminates the need for constraining structure on the reel support stand such as that described in the Tyrrell Patent 2,578,953, col. 4. If the opposed lever arrangement is not employed, some form of constraining force is necessary otherwise a single eccentric shaft member connected to a peripheral segment would merely rotate within its journal, and the axial component of the curvilinear motion of the output lever means would be imparted to the outer segment.

The input motion applied to each of levers 92 and 101 by lugs 74 and 75 respectively is the same. The movable lugs are confined to rectilinear radial motion because the segment 14, to which the movable lugs 74 and 75 are secured, is confined to such motion by the lugs 62 and 63 which are fixed to the core 10. The eccentric couplings between the movable lugs and the levers convert the rectilinear radial motion of the movable lugs into curvilinear radial motion so that the levers rotate about their respective fulcrums. The input motion applied to each of the levers is multiplied by an amount equal to the ratio of the effective output lever arm to the effective input lever arm. The resultant rectilinear radial component of the motion imparted to peripheral segment 84 has a mechanical advantage in motion substantially equal to the mechanical advantage of either lever which may be readily determined by the well-known manner based on the ratio of the effective output and input arms of the levers.

In the specific embodiments described, a "bell crank" type lever is employed to modify an input motion for delivery to a peripheral segment. The control mechanism of the invention is in no way limited by the type of lever illustrated as other motion modifying means will become obvious to one skilled in the art after the principles of the present invention are understood. Also, the invention is not to be limited to the application wherein the initial source of motion to be modified is rectilinear, as the novel mechanism is readily adaptable to modifying a source of curvilinear motion for delivery as rectilinear motion without departing from the spirit of the invention. Therefore, reference will be had to the appended claims in defining the limits of the invention.

What is claimed is:

1. Coil handling apparatus including an expansible mandrel having a source of motion for expanding and contracting the mandrel and a radially movable peripheral segment, linkage means interconnecting the source of motion and the peripheral segment including a lever having its fulcrum pivotally fixed to the mandrel and its output arm pivotally connected to the peripheral segment, and eccentric means connecting the source of motion to the linkage means.

2. Coil handling apparatus including an expansible mandrel having a source of motion for expanding and contracting the mandrel and a radially movable peripheral segment, linkage means interconnecting the source of motion and the peripheral segment including a lever having its fulcrum pivotally fixed to the mandrel and its output arm pivotally connected to the peripheral segment, and eccentric means connecting the linkage means to the peripheral segment.

3. Coil handling apparatus including an expansible mandrel having a source of motion for expanding and contracting the mandrel and a radially movable peripheral segment, linkage means interconnecting the source of motion and the peripheral segment including a lever having its fulcrum pivotally fixed to the mandrel and its output arm pivotally connected to the peripheral segment, and eccentric means connecting the linkage means to the source of motion and the peripheral segment.

4. Apparatus for increasing the operational range of an expansible coil handling mandrel having a fixed core and a radially movable segment comprising fixed lug means attached to the fixed core of the mandrel; movable lug means attached to the radially movable segment; a peripheral segment mounted externally to the radially movable segment; lever means interconnecting the fixed lug means, the movable lug means and the peripheral segment; and eccentric means connecting the movable lug means to the lever means.

5. Apparatus for increasing the operational range of an expansible coil handling mandrel having a fixed core and a radially movable segment comprising fixed lug means attached to the fixed core of the mandrel; movable lug means attached to the radially movable segment; a peripheral segment mounted externally to the radially movable segment; lever means interconnecting the fixed lug means, the movable lug means and the peripheral segment; and eccentric means connecting the lever means to the peripheral segment.

6. Apparatus for increasing the operational range of an expansible coil handling mandrel having a fixed core and a radially movable segment comprising fixed lug means attached to the fixed core of the mandrel; movable lug means attached to the radially movable segment; a peripheral segment mounted externally to the radially movable segment; lever means interconnecting the fixed lug means, the movable lug means and the peripheral segment; and eccentric means connecting the lever means to the movable lug means and the peripheral segment.

References Cited in the file of this patent

UNITED STATES PATENTS

| | | |
|---|---|---|
| 130,784 | Bartram | Aug. 27, 1872 |
| 390,719 | Taylor et al. | Oct. 9, 1888 |
| 2,335,602 | Nash et al. | Nov. 30, 1943 |
| 2,678,175 | Wiig | May 11, 1954 |
| 2,682,924 | Lomazzo et al. | July 6, 1954 |
| 2,865,212 | Fischer et al. | Dec. 23, 1958 |

FOREIGN PATENTS

| | | |
|---|---|---|
| 435,261 | Germany | Oct. 20, 1926 |